Figure 1:
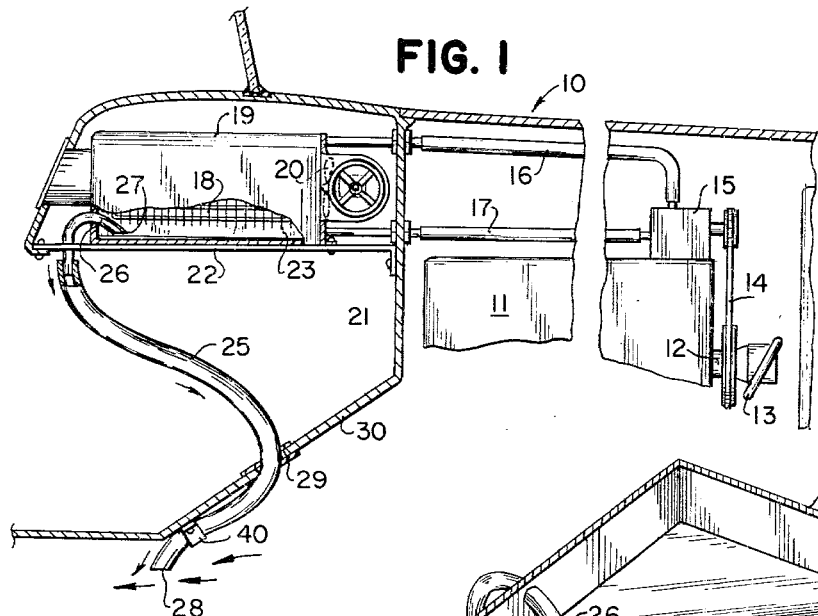

Aug. 10, 1965    L. C. WILLIS    3,199,307
WATER EVAPORATOR FOR AUTOMOBILE AIR CONDITIONER
Filed Aug. 24, 1964

INVENTOR
LESTER C. WILLIS

BY
ATTORNEY

United States Patent Office 3,199,307
Patented Aug. 10, 1965

3,199,307
WATER EVAPORATOR FOR AUTOMOBILE
AIR CONDITIONER
Lester C. Willis, 1581 Waterwitch Drive, Orlando, Fla.
Filed Aug. 24, 1964, Ser. No. 391,386
3 Claims. (Cl. 62—241)

This invention relates to the control of the temperature and humidity of the air in areas occupied by animate objects, primarily human beings, including automobiles and other mobile vehicles, and also relates to apparatus and equipment utilized in the accomplishment of such results.

The invention relates particularly to the removal of moisture including that from the atmosphere and deposited on the cooling coils of an air conditioning system of an automobile or other mobile unit to avoid the dripping and draining of such moisture into the vehicle and onto a surface in the area where the vehicle is stopped or parked such as a garage, car port, or other location.

In the operation of air conditioning systems including mobile vehicles moisture removed from the air is released from the cooling coils when the power to the air conditioning system is interrupted presenting a problem of collection and disposition to avoid it dripping into the vehicle or onto the surface and creating an objectionable wet place or puddle beneath the vehicle.

It is an object of the invention to provide a simple, inexpensive, readily available and easily applied device for collecting and removing while the vehicle is in motion excess water from the air conditioning system of the vehicle, which attachment can be easily attached to an automobile air conditioning system at the time of or after manufacture, making it possible for the manufacturer to utilize the collection pan located beneath the cooling unit of the air conditioning system for the purpose indicated by adding a vacuum drain tube in the rear of and above the bottom of the pan and providing a siphon for removing or disposing of the collected water.

Another object of the invention is to provide means whereby water can be allowed to accumulate in a tank but not drain from the automobile when immobile but when the vehicle is set in motion the water will be forced rearwardly and will fill and start a siphon drainage and disposition system and in addition utilizing air velocity by the passage of air under the mouth of the drain to create suction and keep the water substantially removed by such siphonage.

A still further object of the invention is to provide a collection receptacle for the collection of the excess water discharged from an air conditioning system of an automobile or the like, which vessel is large enough in capacity to provide sufficient space to accommodate a greater volume of water than that collected and thus prevent the bursting of the vessel or damage by freezing or other causes.

Figure 2:
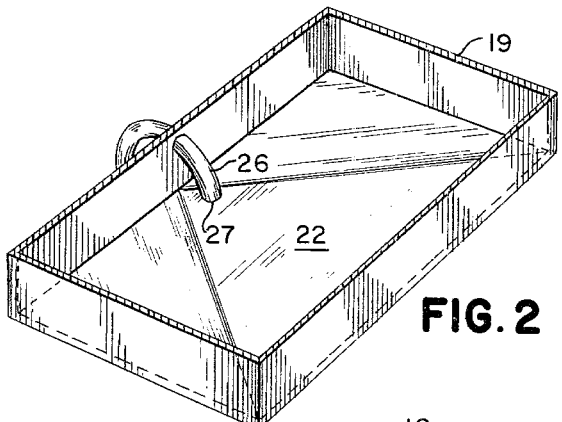
Figure 5:
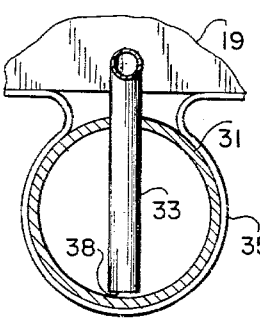
Figure 4:
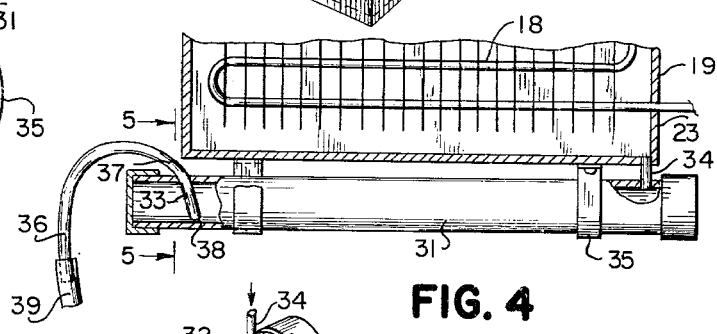
Figure 3:
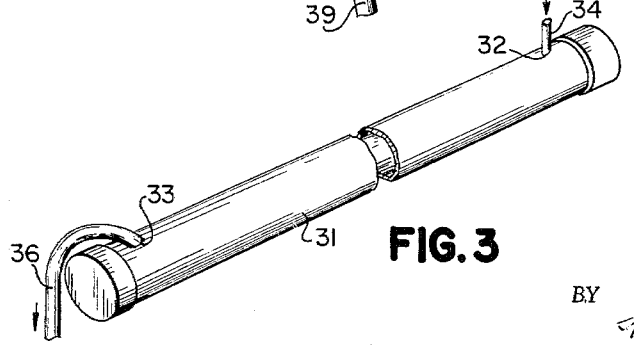

Other objects and advantages of the invention will be apparent from the following description taken in conjunction with the accompanying drawing in which:

FIG. 1 is a diagrammatic view illustrating one application of the invention;

FIG. 2, an enlarged sectional view in perspective of the pan in FIG. 1;

FIG. 3, a perspective of a pan to be used with air conditioner already in place in an automobile;

FIG. 4, a fragmentary section of an air conditioning unit in place in an automobile with the tank in FIG. 3 in place; and FIG. 5, an enlarged cross section on the line 5—5 of FIG. 4.

Briefly stated the invention is a tank, receptacle, or collection vessel of a size to accommodate all of the water discharged from an air conditioning system of a mobile vehicle and oversize to avoid any damage by freezing or the like, with such tank or container disposed beneath the air conditioning system so that when the vehicle is in motion the water will be caused to move rearwardly within the tank or container and with such tank or container equipped with a siphon in the form of a tube extending from the interior of the tank near the bottom, over the top of the tank, and downwardly for a sufficient distance below the bottom to produce a siphon action to draw and discharge the water from the tank.

With continued reference to the drawing a conventional mobile vehicle or automobile 10 has an engine 11 with a crank shaft 12 from which power is obtained for driving a fan 13 and by means of a belt 14, for driving a compressor 15 of a refrigeration system. Such system includes refrigerant supply and return lines 16 and 17 connected to a refrigerating coil 18 located within a housing or unit 19 over which coils air is blown by a fan 20 to supply the desired refrigerating effect. The unit 19 is preferably mounted under the dash and adjacent to the fire wall 21 of the automobile 10 and secured in place by brackets 22.

Moisture from the atmosphere will be deposited as ice on the coils 18 and this moisture or ice will melt and the resultant water will be released with the interruption of power to the system. The removal and disposition of this water presents a problem and the present invention is directed to the solution of this problem.

The bottom of the housing 19 beneath the cooling coil of a conventional air conditioning system forms a tank, container, or collection vessel 23 in which the defrosting moisture or water is collected. In order that this water be prevented from coming in contact with or being discharged into the interior of the vehicle or beneath the same to the tank, pan, or collection vehicle 23, a discharge tube 25 is added. This tube has inclined end portion 26 terminating in an inlet opening 27 near the tank forming bottom of the housing 19. The central portion of the tube is high enough to prevent drainage while the discharge vessel is at rest. The remote or discharge end 28 of the tube 25 is located below the inlet end to provide a siphon and the discharge end of the tube is extended through an opening 29 in the floor board 30 of the automobile 10 so that when water flows through the tube, it will be discharged to the exterior beneath the floor board of the automobile. The outlet end of the tube is exposed to the air in a manner that the air produces a partial vacuum in the tube to draw water into the discharge.

It will be understood that the construction just described is directed to the production of the invention at the time of original manufacure. In order to convert or apply applicant's invention to already manufactured and installed systems, a tank 31 may be provided in the form of a relatively long cylinder or of other configuration and in the top wall of such tank openings 32 and 33 are provided. The opening 32 has a drainage tube or connection 34 with the collection vessel 23 which forms the bottom of the housing 19. Through the connection 34 the defrost moisture from the coils 18 is discharged into the tank 31. The tank 31 may be mounted beneath the tank or pan 23 by means of straps 35.

In order to discharge the drainage water from the tank 31, a discharge tube 36 is provided corresponding to the discharge tube 25, such tube having a downwardly inclined portion 37 extending through the opening 33 and terminating in an inlet end or extremity 38 near the bottom of the tank 31. The discharge tube 36 functions in the same manner as the discharge tube 25, including a hose 39 extended downwardly and through the opening 29 in the floor board 30. The hose 39 may have its lower end portion secured by a bracket 40 to the under surface of the floor board 30.

With applicant's invention, regardless of whether the tank 23 or the tank 31 is employed, the rush of water caused by the forward motion of the vehicle will be toward the rear end of the tank and this will cause the water to fill the upper end of the tube 25 or the tube 36 and thus produce a siphon action to empty the contents of the respective tank.

It will be understood that each of the collection vessels or tanks 23 and 31 has a greater capacity than the amount of defrost water collected so that there will never be any danger of the tanks being completely filled and subject to rupture upon freezing. Further, it will be understood that water collected in either of the tanks 23 and 31 will be retained there as long as the vehicle is at rest or not in motion, but when the vehicle is caused to move forwardly the water in the respective tank will travel toward the rear, which will produce the described siphon action with the discharge widely spread by the air to cause quick evaporation thereof. Also, as the discharge water is removed, there will be continuous operation keeping the drainage water removed while the vehicle is in motion.

It will be apparent from the foregoing that an inexpensive simple and efficient structure is provided for removal of the drainage water from the cooling coil of an automobile which can be incorporated at the time of manufacture or by the individual owner and which involves structure on which there will be no upkeep.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A device for the removal of liquid released from the cooling portion of an air conditioning system of a mobile vehicle, which cooling portion is located within the vehicle, said device comprising a collection receptacle connected to said cooling portion in a manner to receive liquid therefrom after the operation of the air conditioning system is interrupted, said collection receptacle having a capacity sufficient to receive all of the liquid released to avoid overflow and the rupturing of said collection receptacle by freezing, said collection receptacle having an elongation in the direction of movement of the vehicle sufficient that liquid in said collection receptacle will be caused to surge toward one end of the same when the vehicle moves, and a siphon system including outlet means positioned for exposure to the flow of air past the vehicle, said siphon system being in communication with said one end of the collection receptacle and responsive to the surge of the liquid and to the partial vacuum induced in said outlet means to cause the siphon action to be initiated to discharge liquid from the collection receptacle upon the movement of the vehicle.

2. A device for the removal of liquid from a mobile vehicle comprising a collection receptacle having a capacity in excess of the liquid to be collected to avoid overflow and the freezing and rupturing of the collection receptacle, said collection receptacle having an elongation in the direction of movement of the vehicle sufficient to cause collected liquid to surge toward the rear of the same due to vehicle movement, and a normally inoperative system for discharging liquid from said collection receptacle including means actuated by the rearward surge of liquid to cause operation of the same to empty the collection receptacle, said means including a siphon having one end portion in open communication with the rear portion of the same and another portion of said siphon exposed to air flow past the vehicle for producing a partial vacuum therein.

3. A device for the removal of liquid from a mobile vehicle comprising a collection receptacle having a capacity in excess of the liquid to be collected to avoid overflow and the freezing and rupturing of the collection receptacle, said collection receptacle having an elongation in the direction of movement of the vehicle sufficient to cause collected liquid to surge along said elongation due to vehicle movement, and a normally inoperative system for discharging liquid from said collection vessel, said system including means mounted for response to the surge of the liquid in said receptacle and to a partial vacuum in said means induced by flow of air past the vehicle.

References Cited by the Examiner

UNITED STATES PATENTS

| 1,818,415 | 8/31 | Mayer | 98—2 |
| 2,094,221 | 9/37 | Shaller | 62—244 |
| 2,166,635 | 7/39 | Locke | 62—244 |
| 2,430,335 | 11/47 | Hart | 62—244 |
| 2,532,618 | 12/50 | Henney | 62—323 |
| 2,617,440 | 11/52 | Stephens | 137—147 |
| 2,802,348 | 8/57 | White | 62—285 |

WILLIAM J. WYE, *Primary Examiner.*